United States Patent [19]
Kakimoto et al.

[11] Patent Number: 5,615,605
[45] Date of Patent: Apr. 1, 1997

[54] AUTOMATIC BREAD PRODUCING MACHINE

[75] Inventors: Yasuhiro Kakimoto, Nara; Noriyuki Yamamoto, Sanda, both of Japan

[73] Assignee: Matsushita Electric Industrial Co., Ltd., Osaka, Japan

[21] Appl. No.: 686,693

[22] Filed: Jul. 26, 1996

[30] Foreign Application Priority Data

Oct. 27, 1995 [JP] Japan ................................ 7-280342

[51] Int. Cl.⁶ .................................................. A47J 27/00
[52] U.S. Cl. ............................. 99/348; 99/331; 99/468; 366/98; 366/146; 366/314
[58] Field of Search ........................... 99/326–334, 348, 99/352–355, 467, 468, 483–486; 366/69, 98, 97, 96, 144–146, 314, 601; 426/504, 512, 523

[56] References Cited

U.S. PATENT DOCUMENTS

| 4,538,509 | 9/1985 | Ojima et al. | 99/348 |
| 4,762,057 | 8/1988 | Hirota et al. | 99/468 |
| 4,836,683 | 6/1989 | Aoyama | 366/98 |
| 4,957,040 | 9/1990 | Nakakura et al. | 99/348 |

*Primary Examiner*—Timothy F. Simone
*Attorney, Agent, or Firm*—Pollock, Vande Sande & Priddy

[57] ABSTRACT

An automatic bread producing apparatus includes a member defining a baking chamber having an opening. A movable lid serves to selectively block and unblock the opening of the baking chamber. A bread mold is disposed in the baking chamber. A controller generates a command signal. An added-food feeding device disposed in the lid is operative for feeding added food into the bread mold. The added-food feeding device is automatically activated in response to the command signal generated by the controller.

13 Claims, 8 Drawing Sheets

AUTOMATIC BREAD PRODUCING MACHINE

BACKGROUND OF THE INVENTION

1. Field of the Invention

This invention relates to an automatic bread producing machine or apparatus.

2. Description of the Prior Art

U.S. Pat. No. 4,957,040 discloses an automatic bread making apparatus including a housing and a baking container disposed in the housing. In the apparatus of U.S. Pat. No. 4,957,040, the baking container is provided with an opening and a source of heat. A kneading container is detachably mounted in the baking container. The kneading container can be covered by a lid assembly. A kneading blade is movably disposed in the kneading container. The kneading blade is driven by a motor to provide kneaded dough. The automatic addition of yeast to the kneaded dough is implemented by a yeast charger without manual intervention.

SUMMARY OF THE INVENTION

It is an object of this invention to provide an improved automatic bread producing apparatus.

A first aspect of this invention provides an automatic bread producing apparatus comprising a member defining a baking chamber having an opening; a movable lid selectively blocking and unblocking the opening of the baking chamber; a bread mold disposed in the baking chamber; first means for generating a command signal; second means disposed in the lid for feeding added food into the bread mold; and third means for automatically activating the second means in response to the command signal generated by the first means.

A second aspect of this invention is based on the first aspect thereof, and provides an automatic bread producing apparatus wherein the third means comprises a power transmission mechanism disposed in the lid, and an actuator connected via the power transmission mechanism to the second means and also connected to the first means for activating the second means via the power transmission mechanism in response to the command signal generated by the first means, the actuator extending outside the lid.

A third aspect of this invention is based on the first aspect thereof, and provides an automatic bread producing apparatus wherein the second means comprises a container for containing the added food, a movable door selectively blocking and unblocking an opening in the lid, and means for tilting the container to allow the added food to drop from the container toward the bread mold in accordance with movement of the door.

A fourth aspect of this invention is based on the third aspect thereof, and provides an automatic bread producing apparatus wherein the third means comprises a power transmission mechanism disposed in the lid, an actuator connected via the power transmission mechanism to the door and also connected to the first means for moving the door via the power transmission mechanism in response to the command signal generated by the first means, the actuator extending outside the lid, and means connected to the container and the power transmission mechanism for selectively allowing and inhibiting tilt of the container.

A fifth aspect of this invention is based on the third aspect thereof, and provides an automatic bread producing apparatus wherein the container is made of resin.

A sixth aspect of this invention is based on the third aspect thereof, and provides an automatic bread producing apparatus wherein the container is removable from the lid.

A seventh aspect of this invention is based on the third aspect thereof, and provides an automatic bread producing apparatus further comprising a return spring connected to the door, and a door shaft connected to the door, wherein the door is rotatable about the door shaft, and the door shaft is located at approximately a center of a width of the door.

An eighth aspect of this invention is based on the third aspect thereof, and provides an automatic bread producing apparatus wherein movement of the door to its open position to allow the added food to drop from the container toward the bread mold is executed twice or more.

A ninth aspect of this invention is based on the first aspect thereof, and provides an automatic bread producing apparatus wherein the lid comprises an outer lid member made of resin, and an inner lid member made of sheet metal and having edges connected to the outer lid member, and wherein the second means comprises a tubular member held between the outer lid member and the inner lid member.

A tenth aspect of this invention is based on the ninth aspect thereof, and provides an automatic bread producing apparatus wherein the tubular member is made of resin.

An eleventh aspect of this invention is based on the ninth aspect thereof, and provides an automatic bread producing apparatus further comprising a lid plate selectively blocking and unblocking an opening of the tubular member, and means for selectively locking and unlocking the lid plate to and from a closed position relative to the tubular member.

A twelfth aspect of this invention is based on the ninth aspect thereof, and provides an automatic bread producing apparatus further comprising a lid plate selectively blocking and unblocking an opening of the tubular member, the tubular member having an aperture for providing communication between an interior of the tubular member and an exterior thereof even when the lid plate blocks the opening of the tubular member.

A thirteenth aspect of this invention is based on the first aspect thereof, and provides an automatic bread producing apparatus wherein the second means comprises a plurality of means for feeding a plurality of added foods into the bread mold respectively.

DESCRIPTION OF THE PREFERRED EMBODIMENTS

A prior-art automatic bread producing apparatus will be described hereinafter for a better understanding of this invention.

Figure 1:
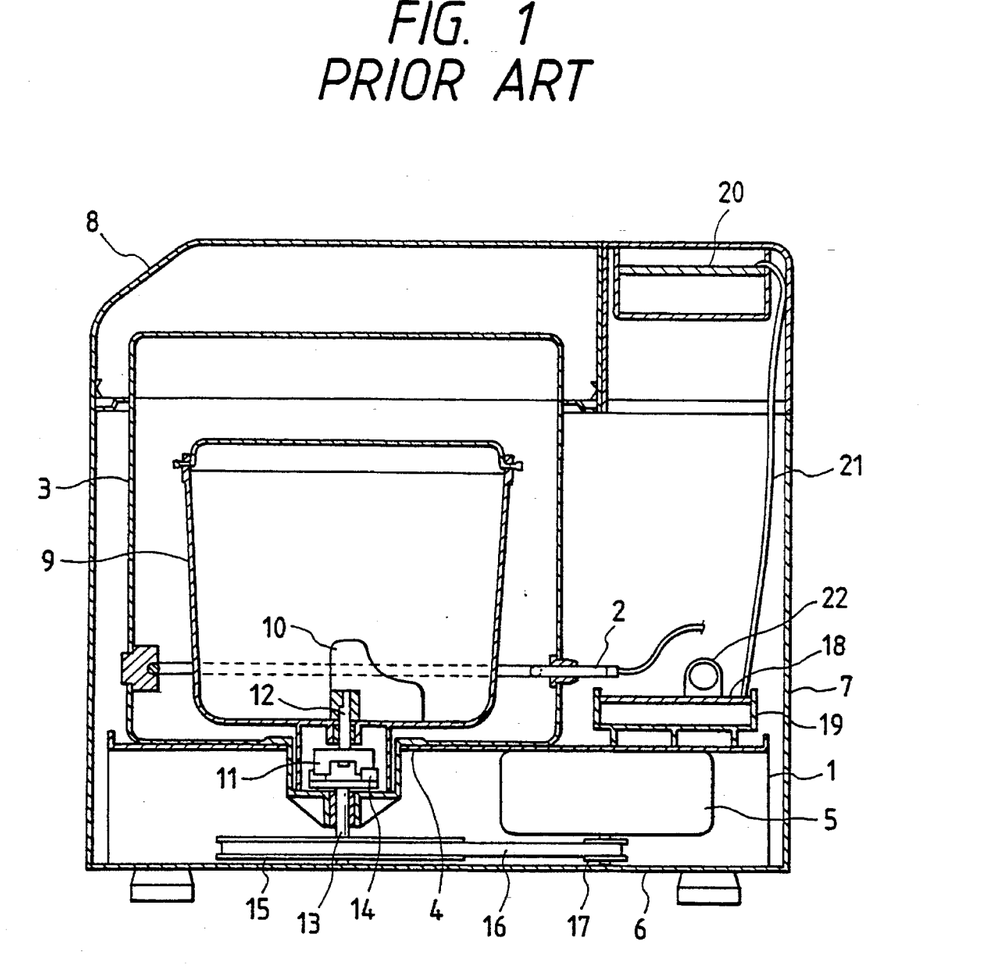
FIG. 1 is a sectional view of a prior-art automatic bread producing apparatus.

FIG. 1 shows a prior-art automatic bread producing apparatus which includes a base 1 and a heater 2. The heater 2 is disposed in a baking chamber 3 extending above the base 1. A cylindrical member defining the baking chamber 3 is fixed to the base 1 by a mold attaching member 4. A casing of a motor 5 is fixed to the lower surface of the base 1. A bottom plate 6 fixes an apparatus body 7 to the base 1. The apparatus body 7 is made of sheet metal. A movable lid 8 selectively opens and closes an upper end of the baking chamber 3.

In the prior-art apparatus of FIG. 1, a bread mold or a bread vessel 9 is detachably placed on the mold attaching member 4. Normally, the bread mold 9 is located in the baking chamber 3. Rotatable mixing vanes (rotatable kneading blades) 10 extend in a central part of a bottom of the bread mold 9. The mixing vanes 10 are mounted on a rotatable shaft 12 supported at the center of the bottom of the bread mold 9. A driven connector 11 is attached to a lower end of the shaft 12. The driven connector 11 can move into and out of engagement with a driving connector 14 in accordance with movement of the bread mold 9 relative to the mold attaching member 4. The driving connector 14 is mounted on an upper end of a rotatable shaft 13 supported by the mold attaching member 4. A large pulley 15 is mounted on a lower end of the shaft 13. The large pulley 15 is connected by a belt 16 to a small pulley 17. The small pulley 17 is mounted on an output shaft of the motor 5. The mixing vanes 10 rotate as the output shaft of the motor 5 rotates.

The prior-art apparatus of FIG. 1 includes a power supply board 18 provided with electric circuits for supplying electric power to the heater 2 and the motor 5. The power supply board 18 is fixed to the base 1 via a support 19 made of resin. A buzzer 22 is located on the power supply board 18. The prior-art apparatus of FIG. 1 also includes an electric circuit board 20 provided with a controller including a microcomputer. The controller on the electric circuit board 20 outputs command signals to controllable electric parts such as a triac and a relay for controlling the heater 2 and the motor 5. The triac and the relay are provided on the power supply board 18. The controller on the electric circuit board 20 is connected by a cable 21 to the electric circuits, the triac, the relay, and the buzzer 22 on the power supply board 18.

The prior-art apparatus of FIG. 1 operates as follows. Bread ingredients are placed in the bread mold 9, and then the apparatus starts to be operated. The controller on the electric circuit board 20 outputs command signals to the triac and the relay on the power supply board 18, thereby controlling the heater 2 and the motor 5 and sequentially executing a dough kneading step, a fermenting step, a gas removing step, and a baking step. During the execution of the baking step, the baking chamber 3 is heated at a temperature of 150° C. to 230° C. The sequence of the dough kneading step, the fermenting step, the gas removing step, and the baking step takes about 4 hours.

The prior-art apparatus of FIG. 1 can produce food-added bread. Examples of the added food are raisins, nuts, and cheese. In a first way of producing food-added bread, bread ingredients and added food are placed in the bread mold 9 before the start of the sequence of the dough kneading step, the fermenting step, the gas removing step, and the baking step. In a second way of producing food-added bread, only bread ingredients are placed in the bread mold 9 and then the dough kneading step is started. In the second way, the buzzer 22 is activated at a given time point during the dough kneading step. The activation of the buzzer 22 informs a user that added food should be manually placed in the bread mold 9. A later part of the kneading step which follows the moment of the activation of the buzzer 22 mixes the bread ingredients and the added food.

According to the first prior-art way of producing food-added bread, the added food tends to be broken into small fragments or to be fused into the bread ingredients during the dough kneading step. Generally, the small fragments of the added food and the fusion of the added food into the bread ingredients decrease the quality of completed bread.

According to the second prior-art way of producing food-added bread, the user is required to stay near the apparatus until the buzzer 22 generates sound.

FIRST EMBODIMENT

Figure 2:
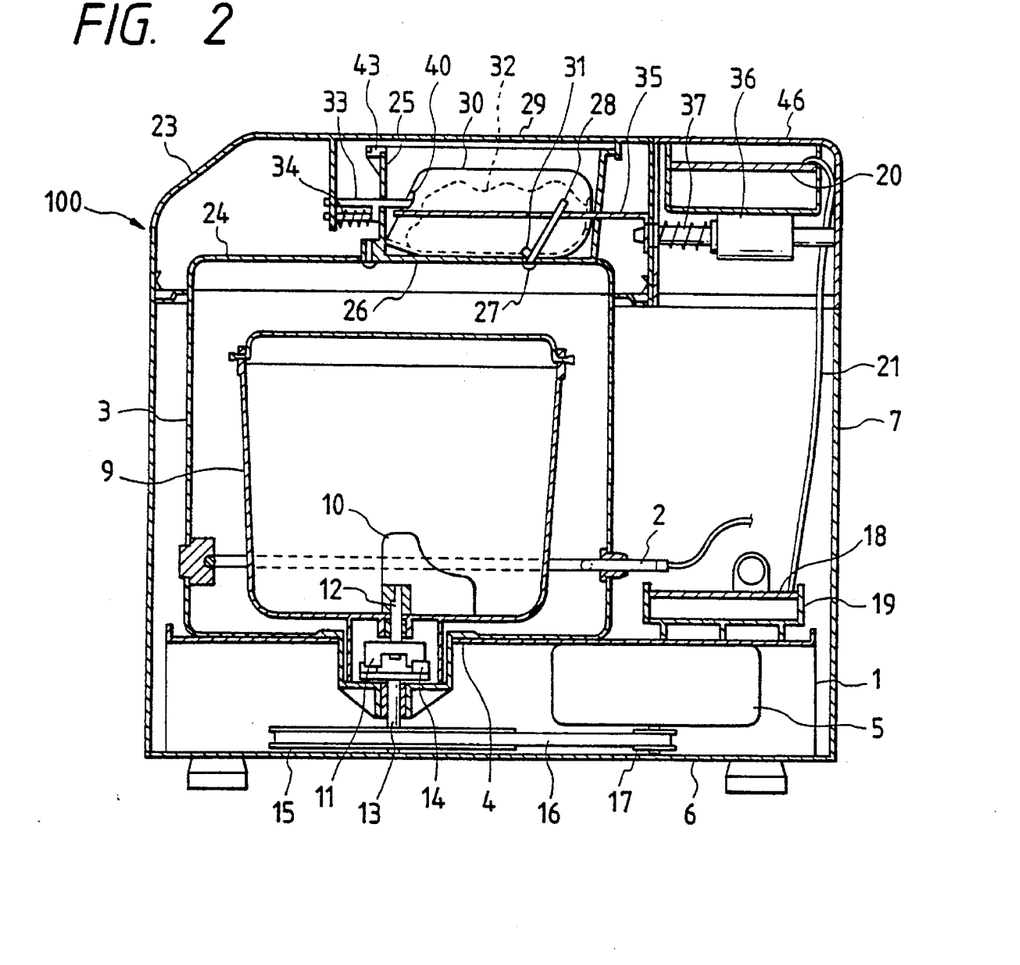
FIG. 2 is a sectional view of an automatic bread producing apparatus according to a first embodiment of this invention.

FIG. 2 shows an automatic bread producing apparatus according to a first embodiment of this invention. With reference to FIG. 2, the automatic bread producing apparatus includes a base 1 and a heater 2. The heater 2 is disposed in a baking chamber 3 extending above the base 1. A cylindrical member defining the baking chamber 3 is fixed to the base 1 by a mold attaching member 4. A casing of a motor 5 is fixed to the lower surface of the base 1. A bottom plate 6 fixes an apparatus body 7 to the base 1. The apparatus body 7 has a cylindrical shape. The apparatus body 7 is made of sheet metal. An outer lid member 23 made of resin is movably connected to the apparatus body 7.

A bread mold or a bread vessel 9 is detachably placed on the mold attaching member 4. Normally, the bread mold 9 is located in the baking chamber 3. Rotatable mixing vanes (rotatable kneading blades) 10 extend in a central part of a bottom of the bread mold 9. The mixing vanes 10 are mounted on a rotatable shaft 12 supported at the center of the bottom of the bread mold 9. A driven connector 11 is attached to a lower end of the shaft 12. The driven connector 11 can move into and out of engagement with a driving connector 14 in accordance with movement of the bread mold 9 relative to the mold attaching member 4. The driving connector 14 is mounted on an upper end of a rotatable shaft 13 supported by the mold attaching member 4. A large pulley 15 is mounted on a lower end of the shaft 13. The large pulley 15 is connected by a belt 16 to a small pulley 17. The small pulley 17 is mounted on an output shaft of the motor 5. The mixing vanes 10 rotate as the output shaft of the motor 5 rotates.

The automatic bread producing apparatus of FIG. 2 includes a power supply board 18 provided with electric circuits for supplying electric power to the heater 2, the motor 5, and a solenoid 36 which will be described later. The power supply board 18 is fixed to the base 1 via a support 19 made of resin. The automatic bread producing apparatus of FIG. 2 also includes an electric circuit board 20 provided with a controller including a microcomputer. The controller on the electric circuit board 20 outputs command signals to controllable electric parts such as a triac and relays for controlling the heater 2, the motor 5, and the solenoid 36. The triac and the relays are provided on the power supply board 18. The controller on the electric circuit board 20 is connected by a cable 21 to the electric circuits, the triac, and the relays on the power supply board 18.

The automatic bread producing apparatus of FIG. 2 further includes a movable inner lid member 24 selectively opens and closes an upper end of the baking chamber 3. The inner lid member 24 is made of sheet metal.

Figure 4:
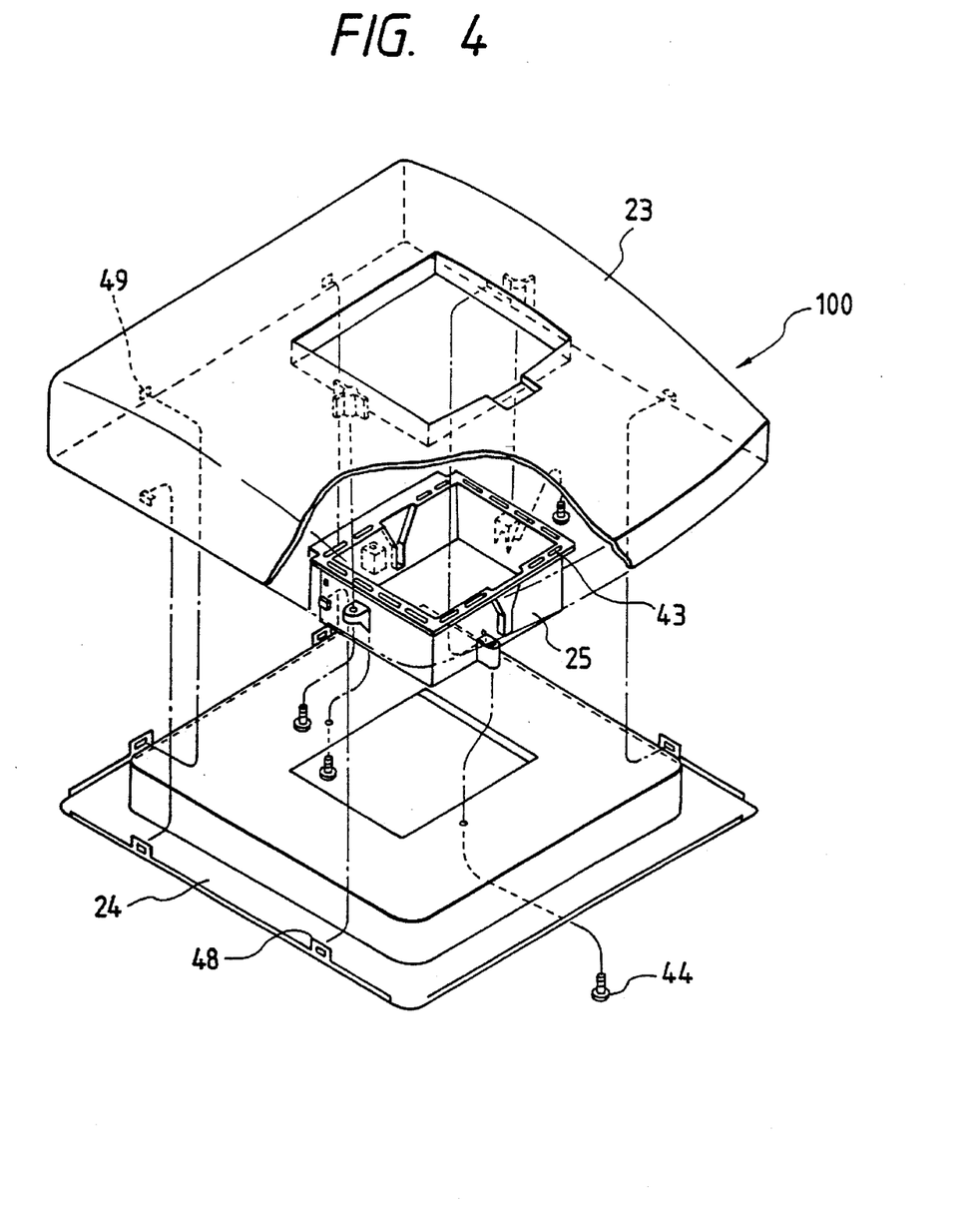
FIG. 4 is an exploded view of a lid assembly in FIG. 2.

As shown in FIG. 4, edges of the inner lid member 24 have six engagement portions 48. The outer lid member 23 has six claws 49 corresponding to the engagement portions 48 of the inner lid member 24. The engagement portions 48 of the inner lid member 24 are firmly connected to the claws 49 on the outer lid member 23 respectively so that the inner lid member 24 is fixed to the outer lid member 23.

With reference to FIGS. 2 and 4, an added-food feeding device includes a tubular container 25 made of resin which is firmly held between the inner lid member 24 and the outer lid member 23. The tubular container 25 has a rectangular cross-section. The tubular container 25 is fixed to the inner lid member 24 by screws 44. The tubular container 25 is also fixed to the outer lid member 23 by screws 44. The outer lid member 23, the inner lid member 24, and the tubular container 25 compose a lid assembly 100 having a high rigidity.

Figure 3:
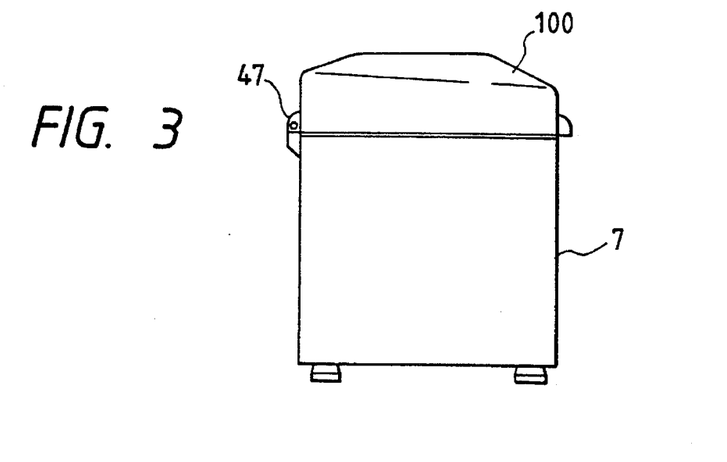
FIG. 3 is a side view of the automatic bread producing apparatus in FIG. 2.

As shown in FIG. 3, the lid assembly 100 is movably connected to the apparatus body 7 by a hinge 47. The lid assembly 100 opens and closes the upper end of the baking chamber 3 in accordance with movement thereof.

Figure 5:
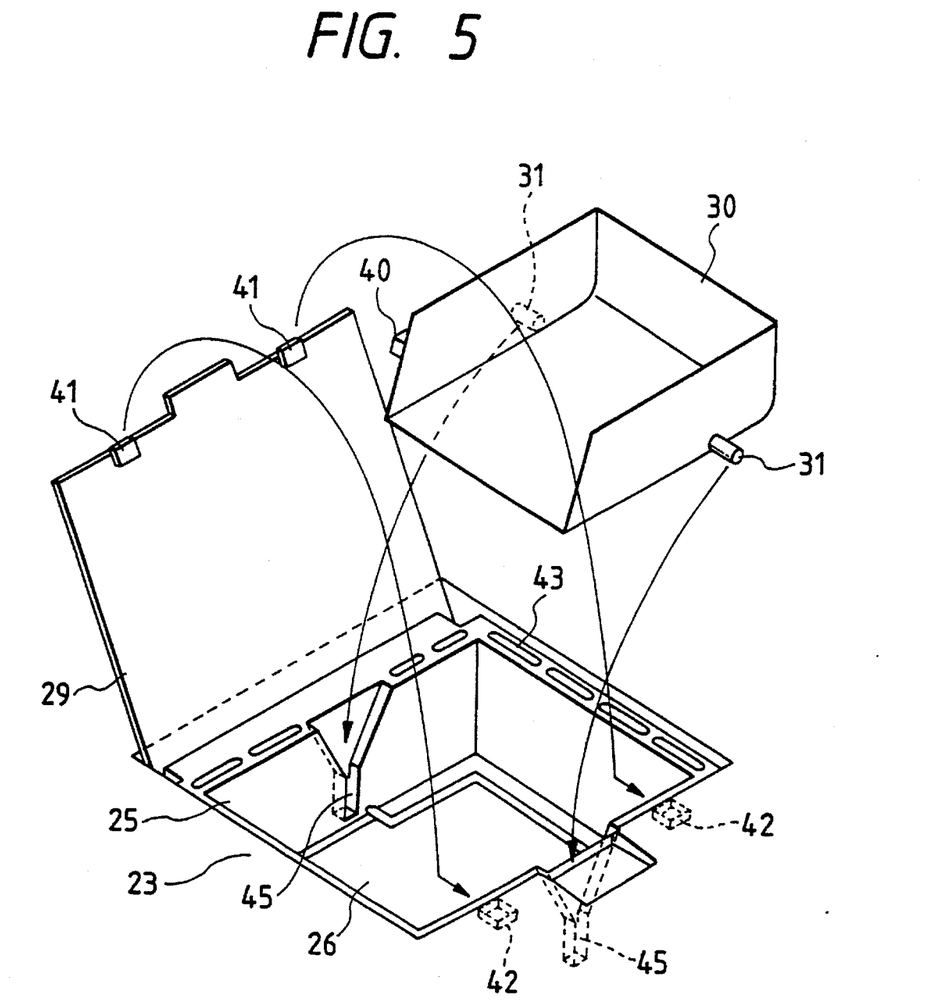
FIG. 5 is an exploded view of a tubular container, an added-food container, and related parts in FIG. 2.

With reference to FIGS. 2 and 5, the added-food feeding device also includes an added-food container 30 made of resin which can be disposed in the tubular container 25. The added-food container 30 is used to hold added food 32, that is, an auxiliary bread ingredient 32 different from main bread ingredients. Opposite sides of the added-food container 30 have outwardly-projecting shafts 31 respectively. The walls of the tubular container 25 have vertically-extending grooves 45 for receiving the shafts 31 of the added-food container 30. When the added-food container 30 is placed into position within the tubular container 25, the shafts 31 of the added-food container 30 are moved into the grooves 45 in the walls of the tubular container 25 and are then guided thereby.

Figure 6:
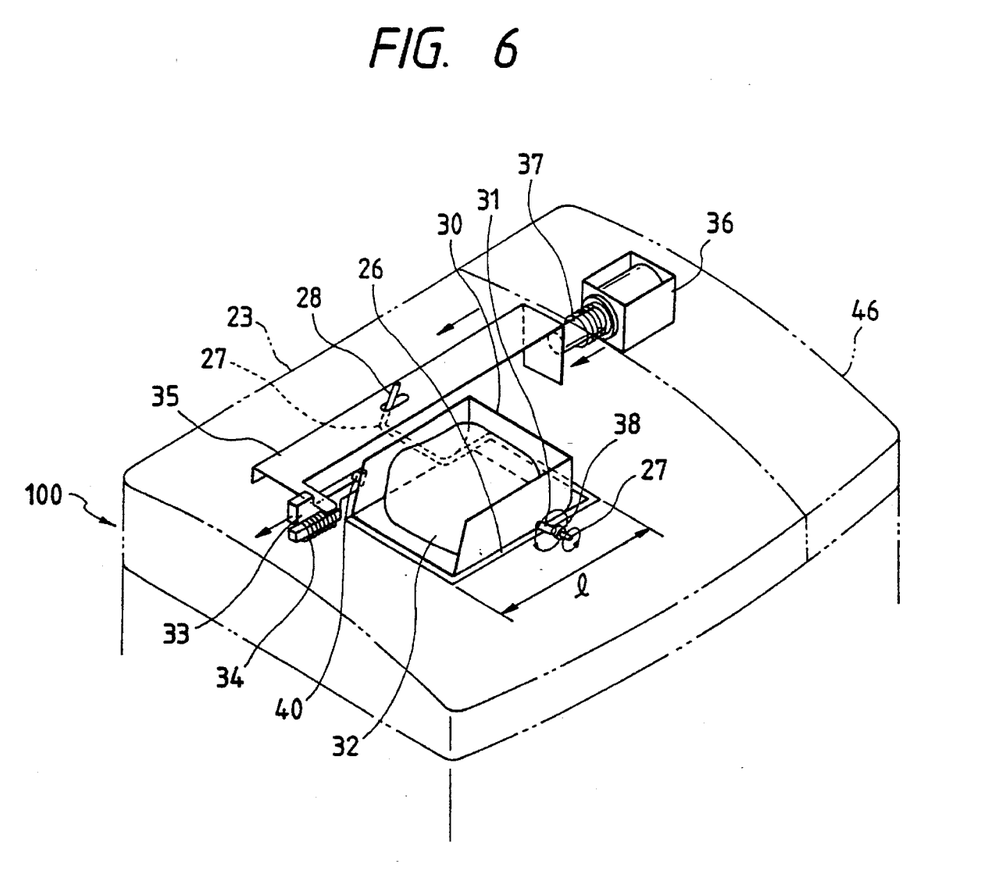
FIG. 6 is a perspective view of a power transmission mechanism in FIG. 2.

As best shown in FIGS. 2 and 6, the lid assembly 100 includes a rotatable door 26 which selectively closes and opens a lower end of the tubular container 25. The door 26 is made of sheet metal. The door 26 has shafts 27 about which the door 26 can rotate. A lever 28 extends from one of the door shafts 27. The lever 28 is integral with the related door shaft 27. The door shafts 27 and the lever 28 are made of steel. The door 26 rotates between a closed position and an open position in accordance with turn of the lever 28. A return spring 38 connected to one of the door shafts 27 urges the door 26 toward its closed position.

The automatic bread producing apparatus includes an operation panel assembly 46 provided on an upper part of the apparatus body 7. The operation panel assembly 46 accommodates the electric circuit board 20. The operation panel assembly 46 also accommodates a solenoid (an electrically-powered actuator) 36. The solenoid 36 has a casing fixed to the operation panel assembly 46, and a horizontally-movable output shaft extending into the lid assembly 100. An end of the output shaft of the solenoid 36 engages a horizontally-movable slider 35. The slider 35 has an aperture through which an end of the lever 28 extends. A return spring 37 is provided between the walls of the operation panel assembly 46 and a shoulder of the output shah of the solenoid 36 (see FIG. 7). The slider 35 engages a horizontally-movable limiting member 33. The limiting member 33 can move into and out of engagement with a projection 40 on the added-food container 30. Normally, the limiting member 33 engages the projection 40 on the added-food container 30 to hold the added-food container 30 fixed. A return spring 34 is provided between the walls of the lid assembly 100 and a shoulder on the limiting member 33.

Figure 7:
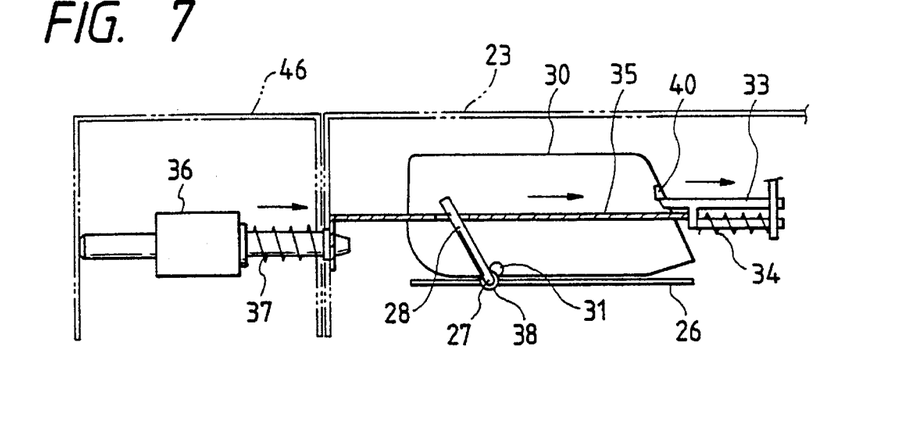
FIGS. 7, 8, and 9 are sectional views of an added-food feeding device and related parts in FIG. 2 which are in different states respectively.
Figure 8:
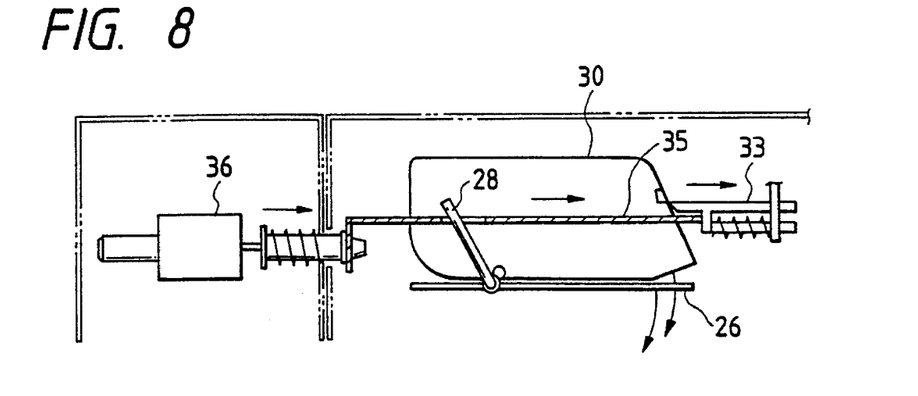
Figure 9:
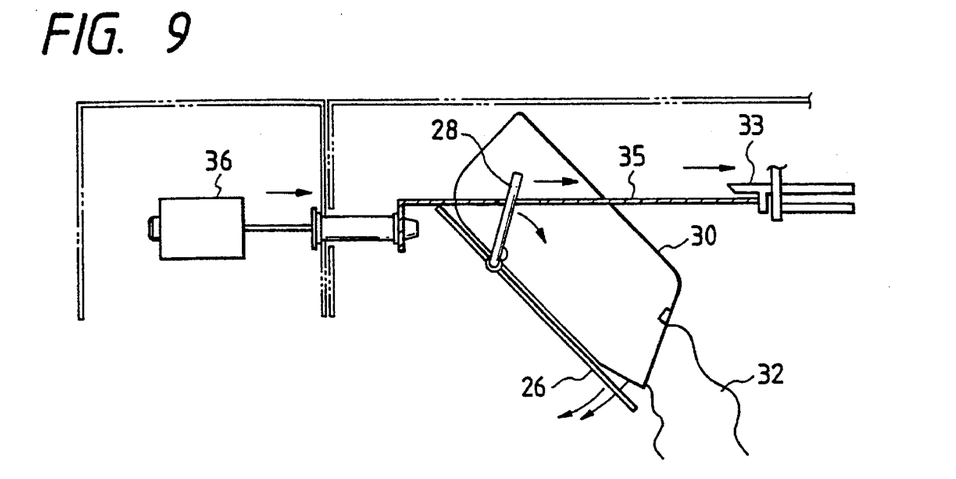

When the solenoid 36 is activated, the output shaft of the solenoid 36 moves forward against the force of the return spring 37. As shown in FIGS. 7, 8, and 9, the slider 35 moves together with the output shaft of the solenoid 36. Thus, the slider 35 turns the lever 28 so that the door 26 rotates from its closed position to its open position against the force of the return spring 38. At the same time, the limiting member 33 moves together with the slider 35 against the force of the return spring 34.

When the solenoid 36 is deactivated, the output shaft of the solenoid 36 is moved backward by the return spring 37. The slider 35 and the limiting member 33 are moved together with the output shaft of the solenoid 36 by the return spring 34. In addition, the door 26 is rotated from its open position to its closed position by the return spring 38. The added-food container 30 rotates together with the door 26. The movement of the slider 35 allows the lever 28 to turn in accordance with the rotation of the door 26.

The added-food container 30 has a box-like shape with an open upper part. One side of the added-food container 30 is also open. When the added-food container 30 is in its normal position within the tubular container 25, the bottom walls of the added-food container 30 is placed on the door 26. It is shown in FIGS. 7, 8, and 9 that the added-food container 30 rotates about the shafts 31 as the door 26 rotates between its open position and its closed position. Generally, the added-food container 30 rotates together with the door 26. When the door 26 is in its closed position, the bottom walls of the added-food container 30 are level so that the added-food 32 can be held in the container 30. In addition, the limiting member 33 engages the projection 40 on the added-food container 30, holding the added-food container 30 fixed. In the case where the solenoid 36 is activated to open the door 26, the slider 35 separates the limiting member 33 from the projection 40 on the added-food container 30 before the slider 35 rotates the lever 28. As previously described, the separation of the limiting member 33 from the projection 40 allows movement of the added-food container 30. The door 26 rotates from its closed position toward its open position in accordance with the rotation of the lever 28 by the slider 35. The added-food container 30 moves together with the door 26, and the bottom walls of the added-food container 30 are inclined. As shown in FIG. 9, when the door 26 is in its open position, the open side of the added-food container 30 faces in a downwardly sloping direction so that added food 32 can drop from the added-food container 30 toward the bread mold 9 via the open door 26.

As shown in FIG. 5, an upper end of the tubular container 25 is selectively closed and opened by a rectangular movable lid 29. One side of the container lid 29 is connected by a hinge to an upper part of side walls of the tubular container 25. The opposite side of the container lid 29 has engagement portions 41. When the container lid 29 is in its closed position, the engagement portions 41 of the container lid 29 extend into holes 42 in walls of the outer lid member 23 so that the container lid 29 is retained by the outer lid member 23. In other words, the container lid 29 is locked to its closed position.

Figure 10:
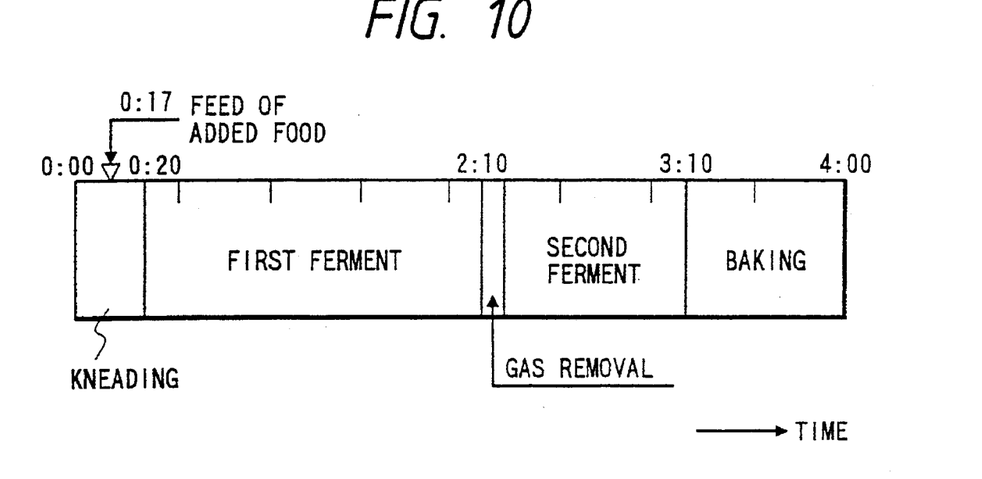
FIG. 10 is a time-domain diagram of a sequence of steps in a bread producing process executed by the automatic bread producing apparatus in FIG. 2.

In the case where the user intends to make bread having added food, the user put main bread ingredients into the bread mold 9 and put an auxiliary bread ingredient 32 into the added-food container 30. The main bread ingredients include flour, water, butter, salt, sugar, and dry milk. The auxiliary bread ingredient 32 is added food such as raisins, nuts, or cheese. Then the user starts the automatic bread producing apparatus. As previously described, the controller on the electric circuit board 20 includes a microcomputer. The controller, that is, the microcomputer, on the electric circuit board 20 operates in accordance with a program stored in a ROM provided therein. The program has a segment for making food-added bread. This segment of the program is designed to implement the following processes. Bread making steps are sequentially executed. Specifically, as shown in FIG. 10, a dough kneading step, a first fermenting step, a gas removing step, a second fermenting step, and a baking step are sequentially executed. In the dough kneading step, the mixing vanes 10 are rotated by the motor 5. During the dough kneading step, at a moment which follows the moment of the start of the dough kneading step by a first given time (for example, 17 minutes) or a moment at which dough (paste of bread) is approximately sufficiently kneaded, the solenoid 36 is activated. As a result, the door 26 is opened and the added food 32 is dropped from the added-food container 30 into the bread mold 9. Thereafter, the solenoid 36 is deactivated to close the door 26 and the dough kneading step is continued for a second given time (for example, 3 minutes) to uniformly disperse or distribute the added food 32 in the bread paste (the dough). The second given time is chosen to prevent the added food 32 from being broken into small fragments and being fused into the main bread ingredients. This setting is effective in preventing completed bread from being colored by small fragments of the added food 32, and preventing the bread past from being excessively fermented by small fragments of the added food 32. This setting is also effective in preventing gluten in the bread paste (the dough) from being cut by small fragments of the added food 32. It should be noted that cutting gluten in the bread paste (the dough) results in a low elasticity and a small height of completed bread. During the baking step, the temperature of the baking chamber 3 is maintained in the range of 150°–230° C. by the heater 2. At this time, the temperature of a surface of the inner lid member 24 is about 150°–230° C. while the temperature of an outer surface of the outer lid member 23 is about 60°–90° C. Thus, the lid assembly 100 is considerably heated. On the other hand, the operation panel assembly 46 continues to has a relatively low temperature. Accordingly, the solenoid 36 within the operation panel assembly 46 is protected from heat generated by the heater 2.

As previously described, the lid assembly 100 is connected to the apparatus body 7 by the hinge 47. When the lid assembly 100 is closed, the lid assembly 100 meets the walls of the apparatus body 7 and hence receives a shock therefrom. Since the solenoid 36 is in the operation panel assembly 46 separate from the lid assembly 100, it is possible to protect the solenoid 36 from the shock on the lid assembly 100.

Placing the added food 32 into the bread mold 9 will be described hereinafter with reference to FIGS. 7, 8, and 9.

When the solenoid 36 is activated, the output shaft of the solenoid 36 moves forward. The slider 35 moves together with the output shaft of the solenoid 36. Thus, the slider 35 turns the lever 28 so that the door 26 rotates from its closed position to its open position. The added-food container 30 rotates together with the door 26. When the door 26 is in its open position, the bottom walls of the added-food container 30 are inclined and the open side of the added-food container 30 faces in the downwardly sloping direction. Therefore, the added food 32 slides along the bottom walls of the added-food container 30 and then exits from the added-food container via its open side before dropping into the bread mold 9 via the open door 26. The added-food container 30 is designed to prevent the added food 32 from falling into a region outside the bread mold 9.

As previously described, the limiting member 33 can move into and out of engagement with the projection 40 on the added-food container 30. When the limiting member 33 engages the projection 40, the added-food container 30 is locked. In this case, the added-food container 30 is inhibited from tilting so that the added food 32 is prevented from moving out of the container 30.

As previously described, during the baking step, the temperature of the baking chamber 3 is in the rage of 150°–230° C. The added-food container 30 contacts the door 26 exposed to the baking chamber 3. Since the added-food container 30 is made of resin, the temperature of the added-food container 30 is limited to about 80° C. This is advantageous in preventing the user from suffering a burn when the user removes the added-food container 30 from the lid assembly 100. Since the added-food container 30 can be removed from the lid assembly 100, it is easy to clean the added-food container 30.

As previously described, the door 26 is moved to its closed position by the return spring 38 when the solenoid 36 is deactivated. It is preferable to locate the door shafts 27 at approximately a center of a width of the door 26. This design enables the door 26 to be returned to its closed position by a relatively weak force. Accordingly, it is possible to decrease the force of the return spring 38.

The activation and deactivation of the solenoid 36, that is, the action of opening and closing the door 26, may be executed twice or more. In this case, the added food 32 can be more reliably dropped from the added-food container 30 into the bread mold 9.

As previously described, the engagement portions 48 of the inner lid member 24 are firmly connected to the claws 49 on the outer lid member 23 respectively so that the inner lid member 24 is fixed to the outer lid member 23. The tubular container 25 is firmly held between the inner lid member 24 and the outer lid member 23. The tubular container 25 is fixed to the inner lid member 24 by the screws 44. The tubular container 25 is also fixed to the outer lid member 23 by the screws 44. Accordingly, the lid assembly 100 including the outer lid member 23, the inner lid member 24, and the tubular container 25 has a high rigidity. The high rigidity suppresses resonance of the lid assembly 100. This is advantageous in reducing the level of noise generated by operation of the automatic bread producing apparatus.

As previously described, the temperature of the inner lid member 24 reaches 150°–230° C. during the baking step. Since the tubular container 25 is made of resin, the tubular container 25 suppresses or blocks the conduction of heat from the inner lid member 24 to the outer lid member 23. This is advantageous in preventing the user from suffering a burn when the user removes the added-food container 30 from the lid assembly 100.

In some cases, the added food 32 does not drop from the added-food container 30 upon rotation of the door 26 to its open position, and then the added food 32 jumps from the added-food container 30 by return of the door 26 to its closed position. The jumping added-food 32 tends to strike against the container lid 29. When the container lid 29 is in its closed position, the engagement portions 41 of the container lid 29 extend into the holes 42 in the walls of the outer lid member 23 so that the container lid 29 is retained by the outer lid member 23. Accordingly, the container lid 29 is held in its closed position even if the jumping added-food 32 strikes thereagainst. Thus, the jumping added-food 32 is prevented from upwardly moving out of the tubular container 25.

As best shown in FIG. 5, the walls of an upper part of the tubular container 25 have openings 43. Even when the container lid 29 is in its closed position, the interior of the tubular container 25 communicates with an exterior thereof via the openings 43. During the baking step, water vaporizes from the bread paste (the dough) and causes humid atmosphere in the baking chamber 3. In addition, the atmosphere is heated by the heater 2. The resulting hot and humid atmosphere enters the tubular container 25 from the baking chamber 3 via a gap between the inner lid member 24 and the door 26. On the other hand, hot and dry atmosphere occurs in a space between the outer lid member 23 and the inner lid member 24. The hot and dry atmosphere enters the tubular container 25 via the openings 43. In the tubular container 25, the hot and humid atmosphere mixes with the hot and dry atmosphere. Therefore, the humid atmosphere is changed to non-humid atmosphere. Thus, it is possible to prevent a dew from being on inner surfaces of the tubular container 25.

SECOND EMBODIMENT

Figure 11:
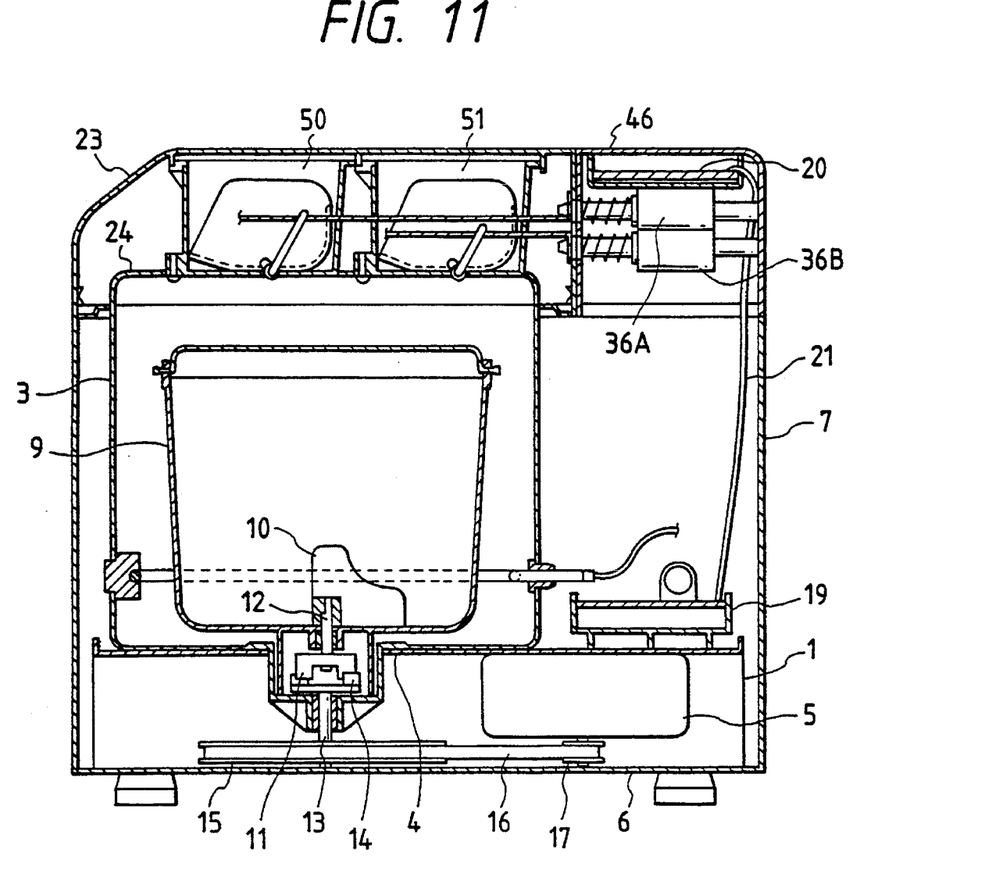
FIG. 11 is a sectional view of an automatic bread producing apparatus according to a second embodiment of this invention.

FIG. 11 shows an automatic bread producing apparatus according to a second embodiment of this invention. The automatic bread producing apparatus of the second embodiment of this invention is similar to the automatic bread producing apparatus of the first embodiment of this invention except for an additional arrangement described later.

The automatic bread producing apparatus of FIG. 11 includes added-food feeding devices 50 and 51 which can be driven by solenoids (electrically-powered actuators) 36A and 36B respectively. The added-food feeding devices 50 and 51 are similar to the added-food feeding device in the first embodiment of this invention.

Figure 12:
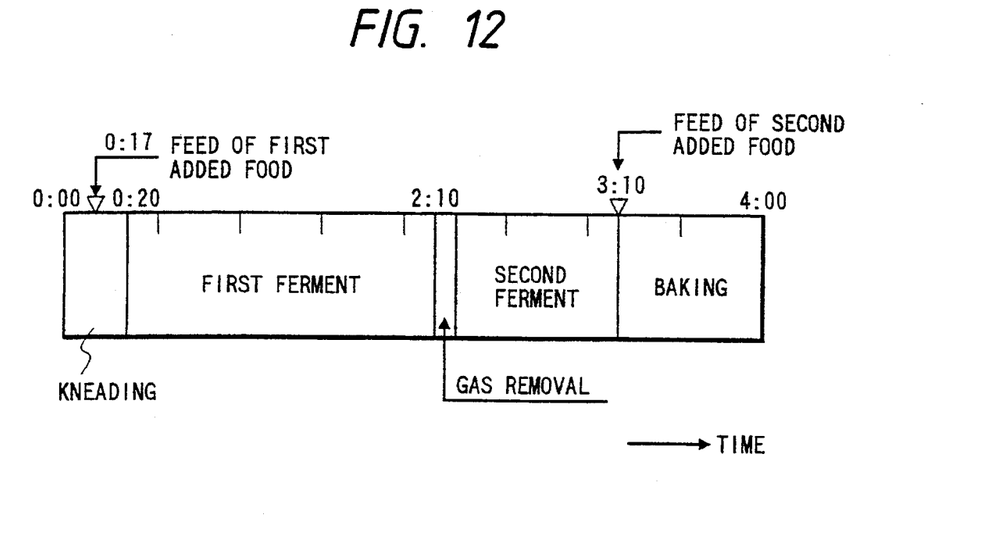
FIG. 12 is a time-domain diagram of a sequence of steps in a bread producing process executed by the automatic bread producing apparatus in FIG. 11.

In the automatic bread producing apparatus of FIG. 11, a controller, that is, a microcomputer, on an electric circuit board 20 operates in accordance with a program stored in a ROM provided therein. The program has a segment for making food-added bread. This segment of the program is designed to implement the following processes. Bread making steps are sequentially executed. Specifically, as shown in FIG. 12, a dough kneading step, a first fermenting step, a gas removing step, a second fermenting step, and a baking step are sequentially executed. At a given time point during the dough kneading step, the added-food feeding device 50 is activated by the solenoid 36A so that added food "A" is dropped from the added-food feeding device 50 into a bread mold 9. For example, the added food "A" includes nuts. Immediately before the start of the baking step, the added-food feeding device 51 is activated by the solenoid 36B so that added food "B" is dropped from the added-food feeding device 51 into the bread mold 9. For example, the added food "B" is cheese.

THIRD EMBODIMENT

Figure 13:
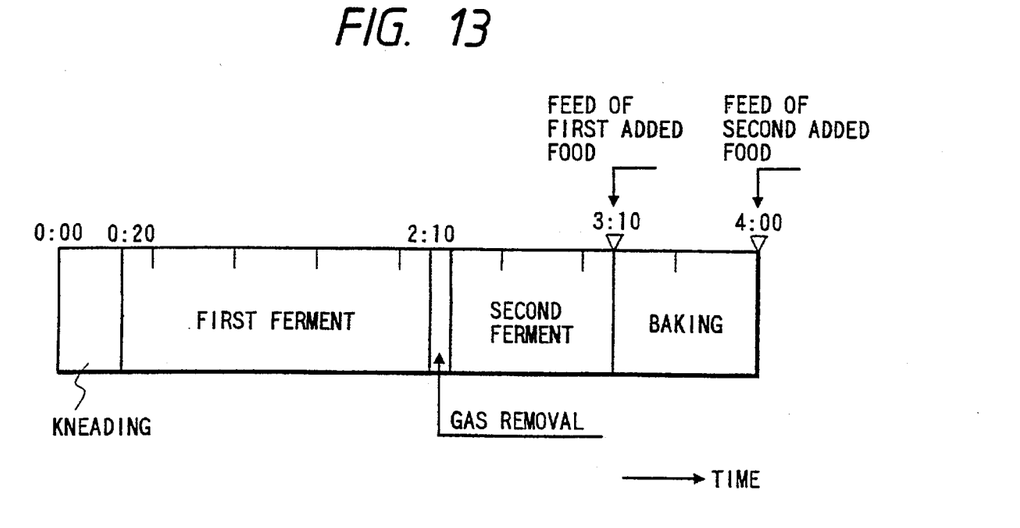
FIG. 13 is a time-domain diagram of a sequence of steps in a bread producing process executed by an automatic bread producing apparatus of a third embodiment of this invention.

A third embodiment of this invention is similar to the second embodiment thereof except for design changes indicated later. In the third embodiment of this invention, a dough kneading step, a first fermenting step, a gas removing step, a second fermenting step, and a baking step are sequentially executed as shown in FIG. 13.

An added-food feeding device 50 (see FIG. 11) remains deactivated during the dough kneading step. Immediately before the start of the baking step, the added-food feeding device 50 (see FIG. 11) is activated so that added food "A" is dropped from the added-food feeding device 50 into a bread mold 9 (see FIG. 11). For example, the added food "A" includes almond slices. Immediately after the end of the baking step, an added-food feeding device 51 (see FIG. 11) is activated so that added food "B" is dropped from the added-food feeding device 51 into the bread mold 9 (see FIG. 11). For example, the added food "B" includes sugar powder.

What is claimed is:

1. An automatic bread producing apparatus comprising:

a member defining a baking chamber having an opening;

a movable lid selectively blocking and unblocking the opening of the baking chamber;

a bread mold disposed in the baking chamber;

first means for generating a command signal;

second means disposed in the lid for feeding added food into the bread mold; and third means for automatically activating the second means in response to the command signal generated by the first means.

2. An automatic bread producing apparatus as recited in claim 1, wherein the third means comprises a power transmission mechanism disposed in the lid, and an actuator connected via the power transmission mechanism to the second means and also connected to the first means for activating the second means via the power transmission mechanism in response to the command signal generated by the first means, the actuator extending outside the lid.

3. An automatic bread producing apparatus as recited in claim 1, wherein the second means comprises a container for containing the added food, a movable door selectively blocking and unblocking an opening in the lid, and means for tilting the container to allow the added food to drop from the container toward the bread mold in accordance with movement of the door.

4. An automatic bread producing apparatus as recited in claim 3, wherein the third means comprises a power transmission mechanism disposed in the lid, an actuator connected via the power transmission mechanism to the door and also connected to the first means for moving the door via the power transmission mechanism in response to the command signal generated by the first means, the actuator extending outside the lid, and means connected to the container and the power transmission mechanism for selectively allowing and inhibiting tilt of the container.

5. An automatic bread producing apparatus as recited in claim 3, wherein the container is made of resin.

6. An automatic bread producing apparatus as recited in claim 3, wherein the container is removable from the lid.

7. An automatic bread producing apparatus as recited in claim 3, further comprising a return spring connected to the door, and a door shaft connected to the door, wherein the door is rotatable about the door shaft, and the door shaft is located at approximately a center of a width of the door.

8. An automatic bread producing apparatus as recited in claim 3, wherein movement of the door to its open position to allow the added food to drop from the container toward the bread mold is executed twice or more.

9. An automatic bread producing apparatus as recited in claim 1, wherein the lid comprises an outer lid member made of resin, and an inner lid member made of sheet metal and having edges connected to the outer lid member, and wherein the second means comprises a tubular member held between the outer lid member and the inner lid member.

10. An automatic bread producing apparatus as recited in claim 9, wherein the tubular member is made of resin.

11. An automatic bread producing apparatus as recited in claim 9, further comprising a lid plate selectively blocking and unblocking an opening of the tubular member, and means for selectively locking and unlocking the lid plate to and from a closed position relative to the tubular member.

12. An automatic bread producing apparatus as recited in claim 9, further comprising a lid plate selectively blocking and unblocking an opening of the tubular member, the tubular member having an aperture for providing communication between an interior of the tubular member and an exterior thereof even when the lid plate blocks the opening of the tubular member.

13. An automatic bread producing apparatus as recited in claim 1, wherein the second means comprises a plurality of means for feeding a plurality of added foods into the bread mold respectively.

* * * * *